F. B. BETTS.
Carriage Gate.
No. 23,345.
Patented March 29, 1859.
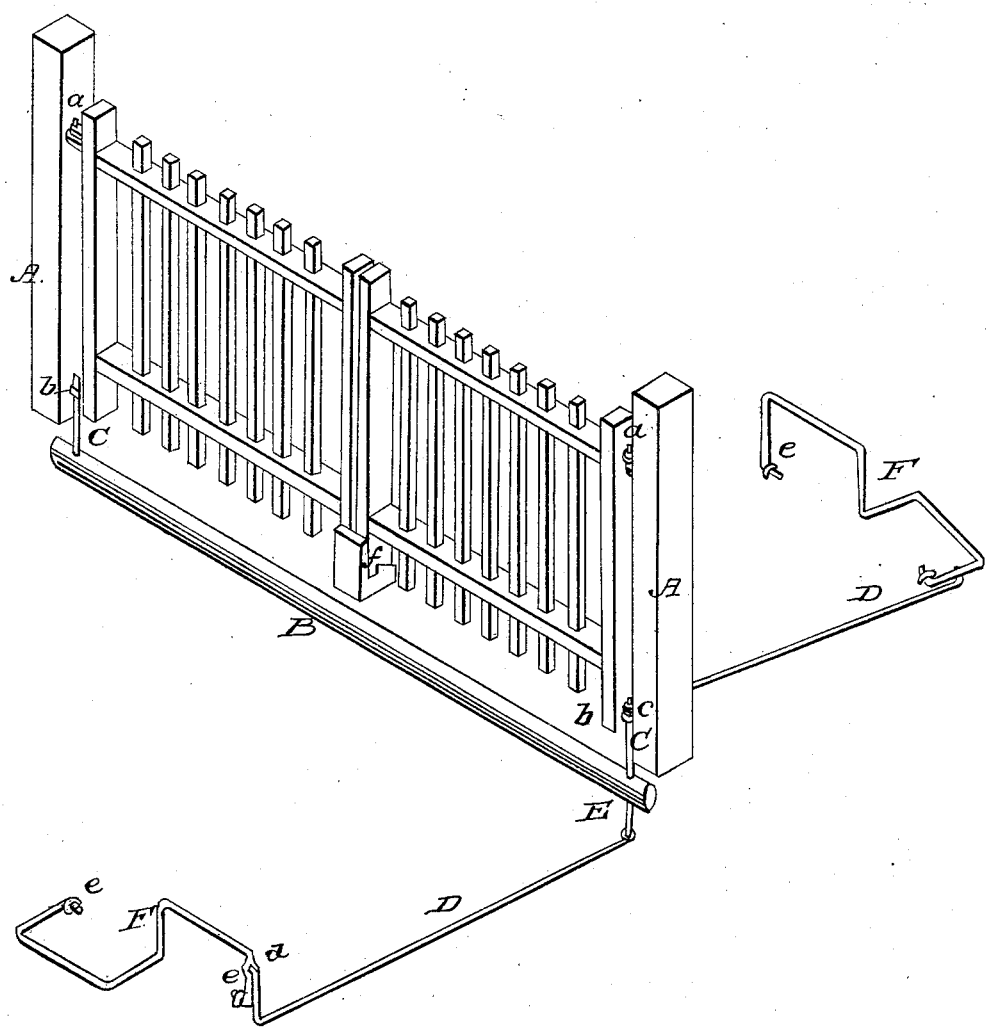

UNITED STATES PATENT OFFICE.

FREDERIC B. BETTS, OF BROWNHELM, OHIO.

METHOD OF OPENING AND CLOSING GATES BY WEIGHT OF VEHICLES.

Specification of Letters Patent No. 23,345, dated March 29, 1859.

*To all whom it may concern:*

Be it known that I, FREDERIC B. BETTS, of Brownhelm, in the county of Lorain and State of Ohio, have invented a new and useful Mode of Opening and Closing Carriage-Gates; and I do hereby declare that the following is a full and exact description thereof, reference being had to the accompanying drawings and to the letters of reference marked thereon.

The nature of my invention consists in constructing an apparatus for the purpose of opening and closing gates by the action of carriage or other wheels upon levers which are so constructed and arranged, that by their operation they shift the position of the lower hinge and thus alternately change the center of gravity and thereby cause the gate to swing either out or in as the case may be.

To enable others skilled in the art to make and use my invention I will proceed to describe its construction and operation.

The gate may be single or double, though in the drawing I have made it double, when the leaves swing together in the usual way but so as not to touch each other. The hooks ($a$ $a$ in plate) to the upper hinges should run through the posts and be held with a nut so as to draw up if the gate or leaves sag. The ground should be excavated between the posts (A A) so that a roller (B) may extend across between the posts and from post to post, below the track, the end or journal to rest upon bearings firmly fixed in the ground next to the posts or fastened to them. At each end of the roller I insert an arm or bar (C C) perpendicular to the roller and extending up between the gate and posts so far that an eye ($b$ $b$) fastened into the back and lower part of the gate may receive this bar, and thus form the lower hinge. I recommend, though if the bar be strong it is not necessary, that, in order to prevent this bar from springing outward, a small horizontal roller be placed upon the top, resting and rolling against the posts. I attach to one end of the main extended roller (B) at right angles two long rods (D, D,) extending each way, the one upon the outside of the gate being attached to a pin or bar (E) fastened in and extending below the roller B and the one on the inside being attached to the top of the bar or arm (C) forming the hinge, as shown in the plate, or these attachments may be reversed. The inside rod, being the side toward which the gate swings when opening, fastened as aforesaid to an arm of the roller, extends so far that when the wheel of the approaching carriage strikes the lever (F) connected with it the horses shall stand clear of the opening gate. At right angles with this rod with which it is connected by a pin or axle ($d$) and extending over and fastened by rings ($e$) to the track is a double elongated crooked lever (F F) so shaped that when one portion stands up from the track another portion lies flat upon it as seen in the plate, and so fastened to the long rod (D) that, as the carriage wheel striking the upright portion brings it to the ground and raises the other portion to an upright position, at the same time by means of the long rod connected with the arm of the roller B at $c$, the roller makes a partial revolution by which the gate is lifted from its bottom fastening at ($f$) and the bottom of the back perpendicular bar of the gate is thrown out so as to so change the center of gravity that the gate will necessarily swing forward. The rod (D) upon the opposite side of the gate is similarly connected with the same kind of lever, and the carriage wheel in passing from the gate and striking the lever reverses the position of roller B and causes the gate to close. In driving from the opposite direction it is only necessary to strike the other portions of these levers to cause the same effect.

What I claim as my invention and desire to secure by Letter Patent is—

The combination of the roller B and its appurtenances, with the levers F F and connecting rods D, and with the gate for the purpose specified and substantially as set forth.

FREDERIC B. BETTS.

Witnesses:
H. B. WEST,
M. D. LESLIE.